Figure 4:
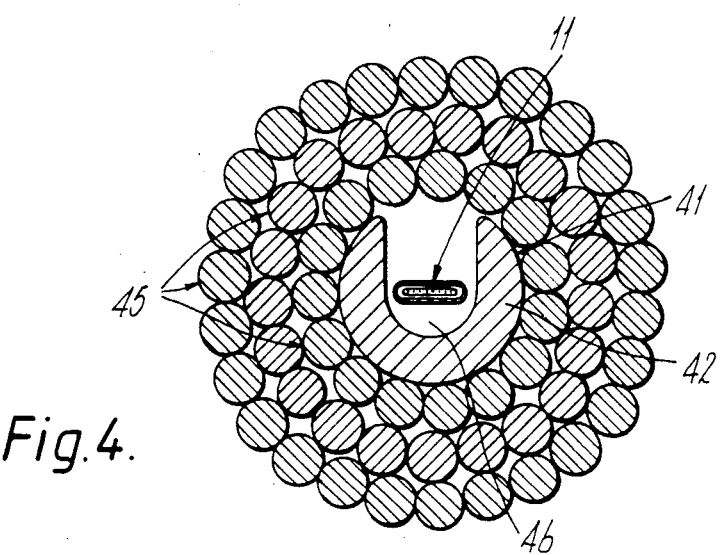

United States Patent [19]

Taylor et al.

[11] Patent Number: 4,699,461
[45] Date of Patent: Oct. 13, 1987

[54] OVERHEAD FLEXIBLE ELECTRIC CONDUCTOR

[75] Inventors: John E. Taylor, Maidenhead; Ian W. Keene, London, both of England

[73] Assignee: BICC Public Limited Company, London, England

[21] Appl. No.: 711,248

[22] Filed: Mar. 13, 1985

[30] Foreign Application Priority Data

Mar. 14, 1984 [GB] United Kingdom ............... 8406636

[51] Int. Cl.$^4$ ............................................. G02B 6/44
[52] U.S. Cl. ................................ 350/96.23; 174/70 R
[58] Field of Search ............... 350/96.23; 174/70 R, 174/70 A, 68 C

[56] References Cited

U.S. PATENT DOCUMENTS

| | | | |
|---|---|---|---|
| 4,188,088 | 2/1980 | Andersen et al. | 350/96.23 |
| 4,359,598 | 11/1982 | Dey et al. | 350/96.23 X |
| 4,513,787 | 4/1985 | Hegler et al. | 174/68 C X |
| 4,514,058 | 4/1985 | Walton | 350/96.23 |

FOREIGN PATENT DOCUMENTS

| | | | |
|---|---|---|---|
| 58-150906 | 9/1983 | Japan | 350/96.23 |
| 1568546 | 5/1980 | United Kingdom . | |
| 1582851 | 1/1981 | United Kingdom | 350/96.23 |
| 2102148A | 1/1983 | United Kingdom | 350/96.23 |
| 2116746A | 9/1983 | United Kingdom | 350/96.23 |
| 2119956A | 11/1983 | United Kingdom | 350/96.23 |
| 2141558A | 12/1984 | United Kingdom . | |
| 2141559A | 12/1984 | United Kingdom . | |

OTHER PUBLICATIONS

"NKF Kabel Develops Silica/Silicone Gel to Protect Fiber Cables from Moisture", *Laser Focus*, vol. 17, No. 2, Feb. 1981, pp. 56, 58.

*Primary Examiner*—John Lee
*Attorney, Agent, or Firm*—Eugene F. Buell

[57] ABSTRACT

An overhead electric conductor comprises a central tubular metal core, at least one layer of helically wound bare metal wires surrounding the core and, loosely housed in the bore of the core, at least one optical fibre element. The optical fibre element comprises a flexible tube of elongate transverse cross-section in which is loosely housed an optical fibre ribbon structure and which is resiliently set in such a form that it follows a path of smoothly curved undulations, the axes of curvature of which lie parallel to one another and normal to the axis of the tube. Should a tensile force applied to the overhead conductor be transferred to the loosely housed optical fibre element, the flexible tube of the element will tend to straighten in a lengthwise direction against the action of its resilient set thereby to reduce any tensile force that might otherwise be applied to the optical fibres and, when the tensile force is removed, the tube will return under the action of its resilient set towards its original form.

22 Claims, 7 Drawing Figures

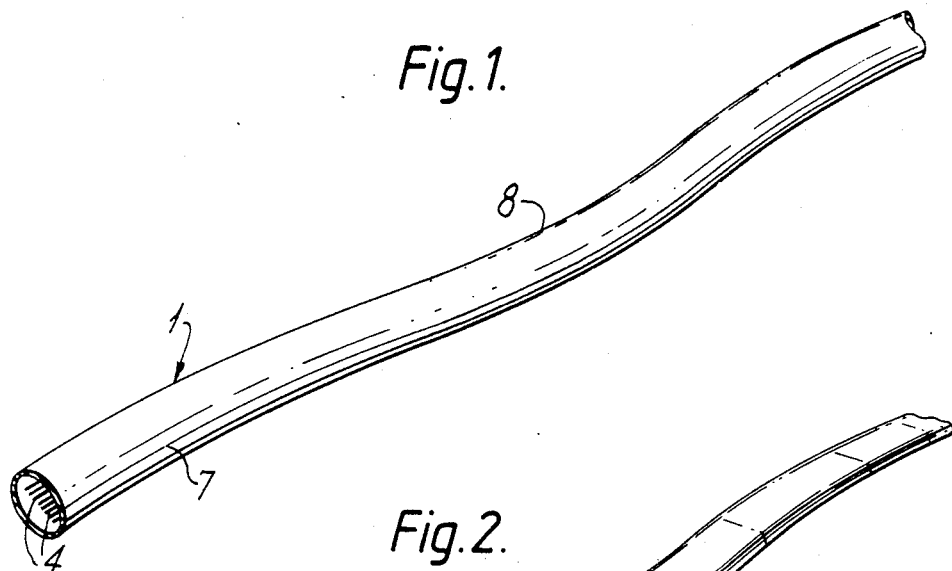
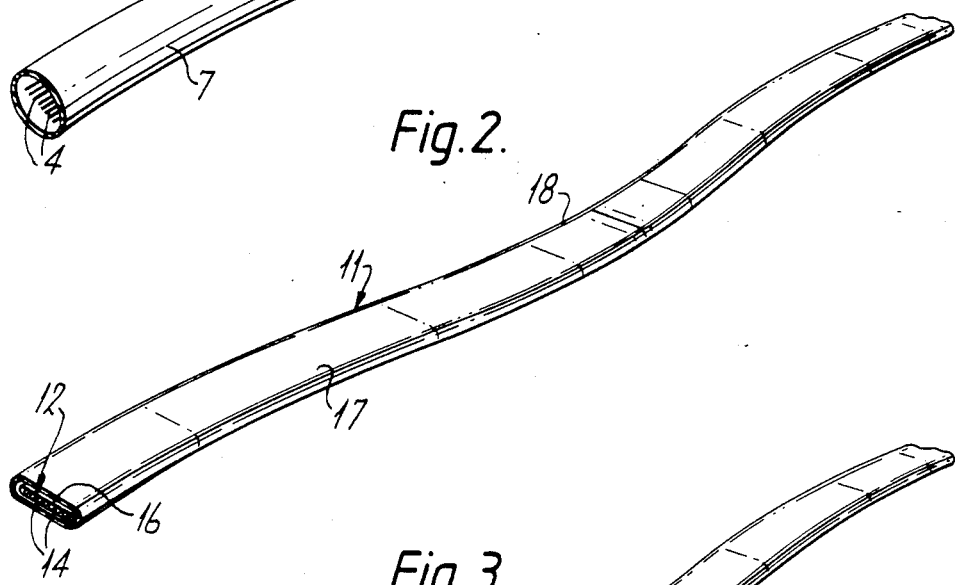
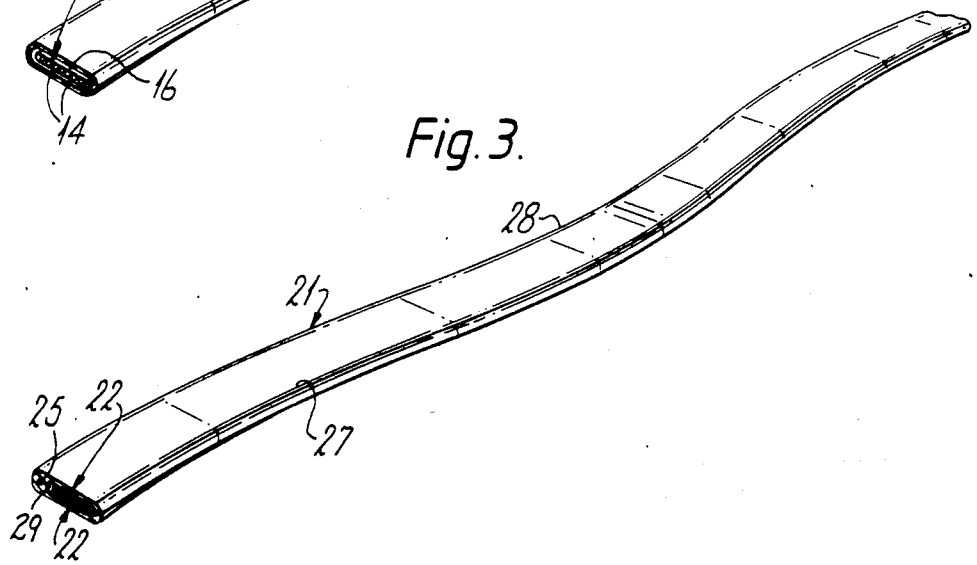

OVERHEAD FLEXIBLE ELECTRIC CONDUCTOR

This invention relates to overhead flexible electric conductors of the kind which comprise one or more than one layer of bare elongate elements of electrically conductive metal or metal alloy and which are adapted to be freely supported from spaced supports in long lengths.

In the specification of U.S. Pat. No. 4,416,508 of Philip Dey et al. there is described an overhead flexible electric transmission conductor comprising at least one layer of helically wound bare elongate elements of metal or metal alloy, at least one elongate compartment formed within and extending throughout the length of the conductor and, loosely housed in the elongate compartment or at least one of the elongate compartments at least one separate flexible optical guide such as a separate optical fibre or an optical bundle.

It is an object of the present invention to provide an improved overhead flexible electric conductor.

According to the invention, the improved overhead flexible electric conductor comprises at least one layer of helically wound bare elongate elements of metal or metal alloy, at least one elongate compartment within and extending throughout the length of the conductors and, loosely housed in the elongate compartment or at least one of the elongate compartments, at least one optical fibre element comprising a flexible tube having a bore in which at least one optical fibre is so loosely housed that, when the tube is bent or otherwise flexed, the optical fibre is free to move to a limited extent transversely of and with respect to the tube, wherein the flexible tube is resiliently set in such a form that the central longitudinal axis of the tube follows a longitudinally extending path which, between any two longitudinally spaced positions, is greater in length than the rectilinear distance between said two positions, the arrangement being such that, when the resiliently set tube is subjected to a longitudinally applied tensile force, the tube will tend to straighten in a lengthwise direction against the action of its resilient set thereby to reduce the tensile force applied to the optical fibre and, when the tensile force is removed, the tube will return under the action of its resilient set towards its original form.

Preferably, the flexible tube of the optical fibre element is resiliently set in such a form that the central longitudinal axis of the tube follows a path of smoothly curved undulations, the axes of curvature of the undulations preferably lying parallel to one another and substantially normal to the longitudinal axis of the tube. By virtue of the smoothly curved undulations, when the resiliently set tube is subjected to a longitudinally applied tensile force, the tube will tend to straighten against the action of its resilient set; that is to say, the length of the radii of the smoothly curved undulations will gradually increase. Alternatively, the flexible tube of the optical fibre element may be resiliently set in such a form that the central longitudinal axis of the tube follows a substantially helical path, the lay of the helically extending path preferably lying in the range 5° to 15° to the central rectilinear axis of the helically extending tube.

The flexible tube of the optical fibre element may be of circular or non-circular cross-section and, in each case, preferably the radial thickness of the tube wall is substantially constant at all transverse cross-sections of the tube. Where the flexible tube is of non-circular cross-section, preferably it has a transverse cross-section of elongate form, e.g. of an elongate form having two major parallel sides joined by ends of approximately semi-circular shape, and in this case preferably the flexible tube is resiliently set in such a form that the central longitudinal axis of the tube follows a path of smoothly curved undulations whose axes of curvature lie substantially parallel to the major transverse axis of the flexible tube.

The flexible tube of the optical fibre element is preferably of a plastics material or plastics materials which can be readily resiliently set to follow a path of the required form but it is to be understood that, in some circumstances, the tube may be of resilient metal or metal alloy.

The or each optical fibre loosely housed in the resiliently set flexible tube preferably is unsupported but, in some circumstances and especially when the tube follows a path of smoothly curved undulations, two or more optical fibres of the optical fibre element may be component parts of at least one optical fibre ribbon structure loosely housed in the bore of the tube. In this case, the optical fibres, and if desired one or more than one flexible elongate reinforcing element, of an optical fibre ribbon structure preferably are arranged side by side and are wholly or partially embedded in a flexible elongate body of plastics material or are arranged side by side and are secured to one major surface of a flexible tape.

The flexible optical fibre and tube structure which form a part of this invention are disclosed in copending application Ser. No. 711,247 filed Mar. 13, 1985.

In all cases, the flexible tube of the optical fibre element may be substantially filled throughout its length with a water-impermeable medium of a grease like nature which is of such a consistency that the or each optical fibre or the or each optical fibre ribbon structure is free to move relative to the tube when the flexible elongate body vibrates, oscillates or is otherwise flexed. The water-impermeable medium of a grease-like nature may consist of, or may comprise as a major constituent, silicone gel.

By virtue of being housed loosely in the elongate compartment, limited relative movement between the or each optical fibre element and the overhead flexible electric conductor can take place when the conductor vibrates, oscillates or is otherwise flexed as may, for example, occur in the case when the conductor is subjected to winds. Limited relative movement between the or each optical fibre element and the overhead flexible electric conductor can also occur when the conductor is subjected to a changing tensile load during and after its installation due to forces imposed on it by winches and brakes, etc. which are used in tensioning the conductor to obtain a predetermined sagging condition; after installation, changes in tensile load in the overhead flexible electric conductor can also occur due to changes in external loading and in temperature. Limited relative movement between the or each optical fibre element and the overhead flexible electric conductor can also occur while the conductor is in service and creep gives rise to non-elastic extension of the conductor. In any of these situations, in the unlikely event that a tensile force applied to the overhead flexible electric conductor, may be transferred, at least in part, to the or any loosely housed optical fibre element, the flexible tube of the element will straighten in a lengthwise direction against the action of its resilient set thereby to reduce any tensile force that might otherwise be applied to the or any optical fibre and, when the tensile force is removed, the tube will return under the action of its resilient set towards its original form.

In one preferred aspect of the invention, an elongate compartment is within and extends throughout the length of a substantially circumferentially rigid central core and the or each layer of helically wound bare elongate elements of metal or metal alloy surrounds the central core. In one preferred embodiment of this aspect of the invention, the central core is a single elongate member having a central bore which constitutes the elongate compartment. The single elongate member initially may be of substantially U-shaped transverse cross-section, one or each of the limbs of the U being folded inwardly so that the gap between the free ends of the limbs is at least partially closed, the space between the limbs and the base of the U constituting the elongate compartment; alternatively, the single elongate member initially may be a tape of metal or metal alloy transversely folded so that its longitudinally extending edges abut to form a tube, the abutting longitudinally extending edges of the tape being welded or otherwise secured together. In all cases, preferably the central core is of substantially circular transverse cross-section.

Alternatively, the central core may be in the form of any one or more of the optional constructions described and illustrated in the aforesaid U.S. Pat. No. 4,416,508 of Philip Dey et al.

In all cases, those parts of the elongate compartment not occupied by the optical fibre element or elements may be substantially filled with a silicone gel or other water-impermeable medium of a grease like nature, the silicone gel or other greasy water-impermeable medium being of such a consistency that the or each optical fibre element is free to move relative to the flexible elongate body when the flexible elongate body vibrates, oscillates or is otherwise flexed. Another greasy water-impermeable medium may consist of, or may comprise as a major constituent, petroleum jelly.

The invention is further illustrated by a description, by way of example, of three preferred forms of optical fibre element suitable for use in an overhead flexible electric conductor and of four preferred forms of overhead flexible electric conductor incorporating an optical fibre element, with reference to the accompanying drawings, in which:

FIGS. 1 to 3 are isometric diagrammatic views, drawn on an enlarged scale, of the three forms of optical fibre element, and FIGS. 4 to 7 are transverse cross-sectional views of the four preferred forms of overhead flexible electric conductor.

Referring to FIG. 1, the first form of optical fibre element 1 comprises eight optical fibres 4 each of which has an overall diameter of 250 $\mu$m and which is loosely housed in the bore of a flexible tube 7 of orientated polyethylene terephthalate, which tube is of substantially constant circular cross-section throughout its length and has a radial wall thickness of 0.4 mm and an internal diameter of 1.8 mm. Each of the optical fibres 4 may have a coating of a colour different from that of a coating on each of the other optical fibres. The flexible tube 7 is resiliently set in such a form that the tube follows a path of smoothly curved undulations 8 which have radii of curvature of approximately 60 mm and whose axes of curvature lie parallel to one another and substantially normal to the longitudinal axis of the tube.

The second form of optical fibre element 11 shown in FIG. 2 comprises an optical fibre ribbon structure 12 comprising eight optical fibres 14 arranged side by side and embedded in an elongate body 16 of silicone acrylate. Each of the optical fibres 14 has an overall diameter of 250 $\mu$m and may have a coating of a colour different from that of the coating on each of the other optical fibres. The optical fibre ribbon structure 12 is loosely housed in the bore of a flexible tube 17 which is made of orientated polyethylene teraphthalate and which has a transverse cross-section of an elongate form having two major parallel sides joined by ends of approximately semi-circular shape. The flexible tube 17 has a substantially constant wall thickness of 0.3 mm, an internal major transverse dimension of 2.5 mm and internal minor transverse dimension of 1.0 mm; the optical fibre ribbon structure 12 has a major transverse dimension of 2.2 mm and a minor transverse dimension of 0.3 mm. The flexible tube 17 is resiliently set in such a form that it follows a path of smoothly curved undulations 18 which have radii of curvature of approximately 60 mm and whose axes of curvature lie substantially parallel to the major transverse axes of the flexible tube.

Referring to FIG. 3, the third form of optical fibre element 21 comprises an elongate body 27 which is made of a thermoplastics material and which has a transverse cross-section of elongate form having two major parallel sides joined by ends of approximately semi-circular shape. The elongate body 27 has a major transverse dimension of 6.0 mm and a minor transverse dimension of 2.0 mm. Extending throughout the length of the elongate body 27 is a bore 29 which has a transverse cross-section of similar shape to that of the body and, embedded in the body on opposite sides of the bore 29, are a pair of resilient copper wires 25. Loosely housed in the bore 29 are two optical fibre ribbon structures 22 each comprising eight optical fibres arranged side by side and embedded in an elongate body of silicone acrylate, each of which optical fibres has an overall diameter of 250 $\mu$m. Each copper wire 25 is set in such a form that the elongate body 27 follows a path of smoothly curved undulations 28 which have radii of curvature of approximately 60 mm and whose axes of curvature lie parallel to one another and to the major transverse axes of the elongate body.

When the optical fibre elements 1, 11, 21 shown in FIGS. 1 to 3 are subjected to a tensile force, the flexible tube 7 and 17 and the elongate body 27 will tend to straighten in a lengthwise direction against the action of the resilient set in the tubes or in the copper wires 25 thereby reducing the tensile force that would otherwise be applied to the optical fibres 4 and optical fibre ribbons 12 and 22. After the tensile force is removed, the resilient set in the tubes 7 and 17 and in the copper wires 25 will cause the optical fibre elements 1, 11, 21 to return towards their original undulating form.

The overhead flexible electric conductor shown in FIG. 4 comprises a central core 41 constituted by a single extruded elongate aluminum member 42 of substantially U-shaped transverse cross-section, the space 46 between the limbs of the U constituting an elongate compartment. The central core 41 is surrounded by three layers 45 of helically wound round wires of aluminum-based alloy, the directions of lay of adjacent layers being of opposite hand. Loosely housed in the elongate compartment 46 is an undulating optical fibre element 11 as shown in FIG. 2.

Figure 5:
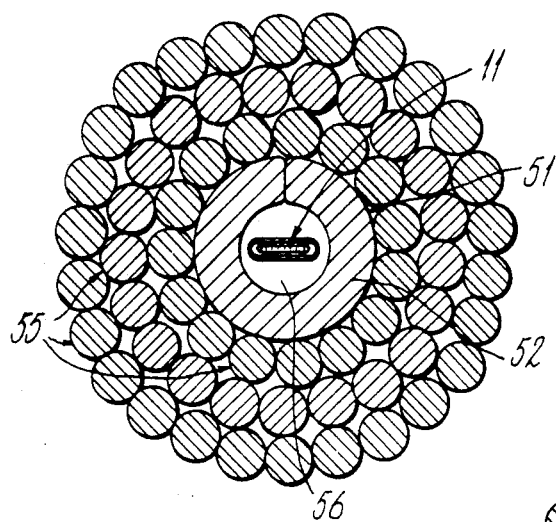
Figure 6:
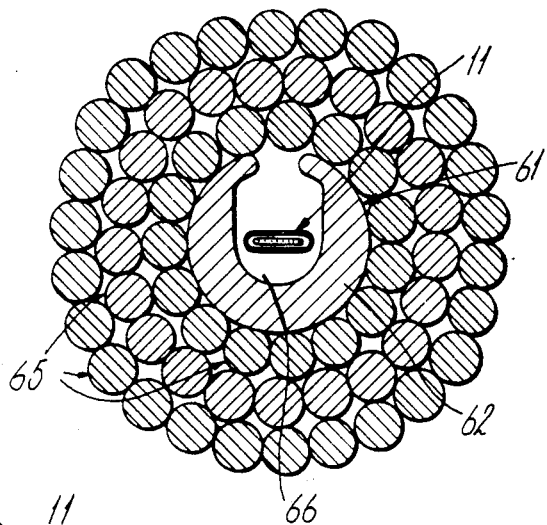

The overhead flexible electric conductors shown in FIGS. 5 and 6 are similar in construction to the overhead flexible electric conductor shown in FIG. 4 except for the form of the central core and, for convenience, components of the flexible conductors shown in FIGS. 5 and 6, respectively, that are similar to those of the overhead conductor shown in FIG. 4 have been given references greater by 10 and by 20 than the references of the corresponding components of the flexible conductor shown in FIG. 4. In the overhead flexible electric conductor shown in FIG. 5, the central core 51 is a tube 52 formed by transversely folding a strip of aluminum-based alloy. In the flexible conductor shown in FIG. 6, the central core 61 is constituted by a single extruded elongate aluminum member 62 of substantially U-shaped cross-section, the gap between the free ends of the limbs of the U being partially closed to retain the undulating optical fibre element 11 in the elongate compartment 66.

Figure 7:
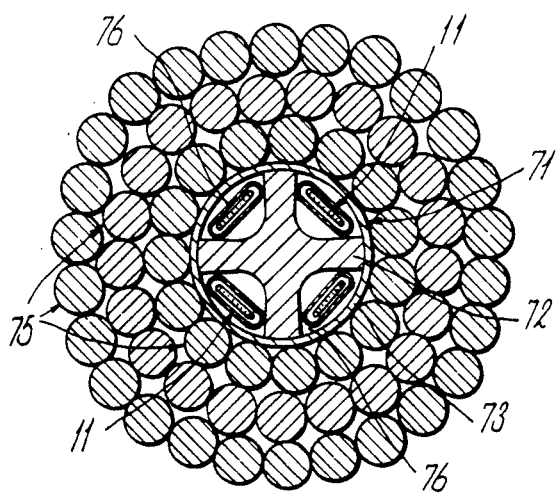

The overhead flexible electric conductor shown in FIG. 7 has a central core 71 consisting of two separately formed parts comprising an inner extruded elongate member 72 of aluminum having in its outer surface four circumferentially spaced, longitudinally extending recesses 76 and, surrounding the inner elongate member, a longitudinally applied transversely folded tape 73 of aluminum, which tape overlies the longitudinally extending recesses to form circumferentially spaced elongate compartments. Loosely housed in each of the elongate compartments 76 is an undulating optical fibre element 11 as shown in FIG. 2. The central core 71 is surrounded by three layers 75 of helically wound round wires of aluminum-based alloy, the directions of lay of adjacent layers being of opposite hand.

In those circumstances where heat may pose a problem, as for example softening of the flexible tube, the flexible tube may be made of a plastics material capable of withstanding temperatures in the order of 300° C. for a short time, such as for example, polyethersulphone or polyetherimide.

In each of the flexible conductors shown in FIGS. 4 to 7, the or each elongate compartment may be substantially filled throughout its length with a silicone gel or other greasy water-impermeable medium.

What we claim as our invention is:

1. An overhead flexible electric conductor comprising at least one layer of helically wound bare elongate elements of metal or metal alloy, at least one elongate compartment within and extending throughout the length of the conductor and, loosely housed in the elongate compartment or at least one of the elongate compartments, at least one optical fibre element comprising a flexible tube having a bore in which at least one optical fibre is so loosely housed that, when the tube is flexed, the optical fibre is free to move to a limited extent transversely of and with respect to the tube, wherein the flexible tube is resiliently set in such a form that the central longitudinal axis of the tube follows a longitudinally extending path which, between any two longitudinally spaced positions, is greater in length than the rectilinear distance between said two positions, the arrangement being such that, when the resiliently set tube is subjected to a longitudinally applied tensile force, the tube will tend to straighten in a lengthwise direction against the action of its resilient set thereby to reduce the tensile force applied to the optical fibre and, when the tensile force is removed, the tube will return under the action of its resilient set toward its original form.

2. An overhead flexible electric conductor as claimed in claim 1, wherein the flexible tube of the optical fibre element is resiliently set in such a form that the central longitudinal axis of the tube follows a substantially helical path, the lay of the helically extending path lying in the range of 5° to 15° to the central rectilinear axis of the helically extending tube.

3. An overhead flexible electric conductor as claimed in claim 1, wherein the flexible tube of the optical fibre element is made of plastics material.

4. An overhead flexible electric conductor as claimed in claim 1, wherein the optical fibre loosely housed in the resiliently set flexible tube of the optical fibre element is unsupported.

5. An overhead flexible electric conductor as claimed in claim 1, wherein the resiliently set flexible tube of the optical fibre element is substantially filled throughout its length with a water-impermeable medium of a grease like nature that is of such a consistency that the optical fibre is free to move relative to the tube when the tube is flexed.

6. An overhead flexible electric conductor as claimed in claim 5, wherein the water-impermeable medium of a grease-like nature in the optical fibre element consists of, or comprises as a major constituent, silicone gel.

7. An overhead flexible electric conductor as claimed in claim 1, wherein those parts of the elongate compartment not occupied by the optical fibre element are substantially filled with a water-impermeable medium of a grease like nature, the water-impermeable medium being of such a consistency that the optical fibre element is free to move relative to the flexible electric conductor when the flexible electric conductor is flexed.

8. An overhead flexible electric conductor comprising at least one layer of helically wound bare elongate elements of metal or metal alloy, at least one elongate compartment within and extending throughout the length of the conductor and, loosely housed in the elongate compartment or at least one of the elongate compartments, at least one optical fibre element comprising a flexible tube having a bore in which at least one optical fibre is so loosely housed that, when the tube is flexed, the optical fibre is free to move to a limited extent transversely of and with respect to the tube, wherein the flexible tube is resiliently set in such a form that the central longitudinal axis of the tube follows a path of smoothly curved undulations whose axes of curvature lie parallel to one another and substantially normal to the longitudinal axis of the tube, the arrangement being such that, when the undulating flexible tube is subjected to a longitudinally applied tensile force, the tube will tend to straighten in a lengthwise direction against the action of the undulating resilient set thereby to reduce the tensile force applied to the optical fibre and, when the tensile force is removed, the tube will return under the action of its undulating resilient set towards its original form.

9. An overhead flexible electric conductor as claimed in claim 8, wherein the flexible tube of the optical fibre element has a transverse cross-section of an elongate form having two major parallel sides joined by ends of approximately semi-circular shape, the flexible tube being resiliently set in such a form that the axes of curvature of the smoothly curved undulations lie substantially parallel to the major transverse axis of the flexible tube.

10. An overhead flexible electric conductor as claimed in claim 9, wherein the flexible tube of the optical fibre element is made of orientated polyethylene terephthalate.

11. An overhead flexible electric conductor as claimed in claim 9, wherein the flexible tube of the optical fibre element is made of a plastics material resistant to elevated temperature selected from the group polyethersulphone and polyetherimide.

12. An overhead flexible electric conductor as claimed in claim 8, wherein the flexible tube of the optical fibre element is of plastics material and has embedded in the tube wall at mutually spaced positions a plurality of resilient elongate reinforcing elements, each of which is so resiliently set as to cause the tube to follow the path of smoothly curved undulations.

13. An overhead flexible electric conductor as claimed in claim 8, wherein the flexible tube of the optical fibre element is made of a resilient metal or metal alloy.

14. An overhead flexible electric conductor as claimed in claim 1 or 8, wherein at least two optical fibres are component parts of at least one optical fibre ribbon structure loosely housed in the bore of the resiliently set flexible tube of the optical fibre element.

15. An overhead flexible electric conductor as claimed in claim 1 or 8, wherein at least one optical fibre ribbon structure is loosely housed in the bore of the resiliently set flexible tube of the optical fibre element, which ribbon structure comprises at least two optical fibres and at least one flexible elongate reinforcing element arranged side by side and at least partially embedded in a flexible elongate body of plastics material.

16. An overhead flexible electric conductor as claimed in claim 1, 8 or 2, wherein the flexible tube of the optical fibre element is of non-circular cross-section and the radial thickness of the tube wall is substantially constant at all transverse cross-sections of the tube.

17. An overhead flexible electric conductor as claimed in claim 1, 8 or 9, wherein the elongate compartment is the bore of a substantially circumferentially rigid central core of metal or metal alloy which is surrounded by the layer or layers of helically wound bare elongate elements of metal or metal alloy.

18. An overhead flexible electric conductor as claimed in claim 1, 8 or 9, wherein the layer or layers of helically wound bare elongate elements of metal or metal alloy surround a single extruded elongate member of metal or metal alloy constituting a substantially circumferentially rigid central core and having a central bore which constitutes the elongate compartment.

19. An overhead flexible electric conductor as claimed in claim 1, 8 or 9, wherein the layer or layers of helically wound bare elongate elements of metal or metal alloy surround a single elongate member of metal or metal alloy of substantially U-shaped transverse cross-section constituting a substantially circumferentially rigid central core, the space between the limbs and the base of the U constituting the elongate compartment.

20. An overhead flexible electric conductor as claimed in claim 1, 8 or 9, wherein the layer or layers of helically wound bare elongate elements of metal or metal alloy surround a single elongate member of metal or metal alloy of substantially U-shaped transverse cross-section constituting a substantially circumferentially rigid central core, the space between the limbs and the base of the U constituting the elongate compartment and at least one of the limbs of the U being folded inwardly so that the gap between the free ends of the limbs is at least partially closed.

21. An overhead flexible electric condcutor as claimed in claim 1, 8 or 9, wherein the layer or layers of helically wound bare elongate elements of metal or metal alloy surround a substantially circumferentially rigid central core comprising a longitudinally extending tape of metal or metal alloy which is transversely folded so that its longitudinally extending edges abut to form a tube whose bore constitutes the elongate compartment, the abutting longitudinally extending edges of the tape being secured together.

22. An overhead flexible electric conductor as claimed in claim 1, 8 or 9, wherein the layer or layers of helically wound bare elongate elements of metal or metal alloy surround a substantially circumferentially rigid central core consisting of two separately formed parts comprising an inner solid elongate member of metal or metal alloy having in its outer surface at least one longitudinally extending recess and, surrounding the inner elongate member, a longitudinally applied transversely folded tape of metal or metal alloy, which tape overlies the longitudinally extending recess to form an elongate compartment.

* * * * *